(12) United States Patent  
Sherman et al.

(10) Patent No.: US 9,061,225 B2  
(45) Date of Patent: Jun. 23, 2015

(54) REINFORCED RECEIVER FOR CASSETTE FILTER LOCKING CLIP

(75) Inventors: Michael J. Sherman, Woodbury, MN (US); Stephen P. Huda, Shelton, CT (US); Steven J. Haehn, Oakdale, MN (US)

(73) Assignee: KX Technologies LLC, West Haven, CT (US)

( * ) Notice: Subject to any disclaimer, the term of this patent is extended or adjusted under 35 U.S.C. 154(b) by 655 days.

(21) Appl. No.: 13/421,349

(22) Filed: Mar. 15, 2012

(65) Prior Publication Data

US 2013/0240430 A1  Sep. 19, 2013

(51) Int. Cl.
*B01D 27/08* (2006.01)
*B01D 35/20* (2006.01)
*B01D 35/30* (2006.01)

(52) U.S. Cl.
CPC .......... *B01D 35/30* (2013.01); *B01D 2201/305* (2013.01); *B01D 35/306* (2013.01); *B01D 27/08* (2013.01); *B01D 2201/4084* (2013.01)

(58) Field of Classification Search
None
See application file for complete search history.

(56) References Cited

U.S. PATENT DOCUMENTS

| 5,700,371 A | 12/1997 | Koslow |
| RE37,216 E | 6/2001 | Koslow |
| 7,067,054 B2 | 6/2006 | Fritze |
| 7,163,237 B2 * | 1/2007 | Niermeyer et al. ............. 285/26 |
| 2009/0308799 A1 | 12/2009 | Cho |

FOREIGN PATENT DOCUMENTS

| EP | 2351609 | 8/2011 |
| KR | 100873294 | 12/2008 |
| KR | 101002092 | 12/2010 |

* cited by examiner

*Primary Examiner* — Thomas M Lithgow
(74) *Attorney, Agent, or Firm* — Robert Curcio; DeLio, Peterson & Curcio, LLC

(57) ABSTRACT

A receiver for a cassette filter housing having an upper housing surface. The receiver comprises an arrow shaped elongated member having ends. The elongated member may be parallel with an upper surface of the cassette and may include a base portion attached to the upper housing surface the cross-section of which is a substantially planer segment extending to the upper surface. The elongated member includes an upper receiver portion having at least one cavaliered retaining surface. The receiver includes a first reinforcement member extending outward from the base portion adjacent one of the ends of the elongated member and perpendicular to the elongated member, and a second reinforcement member extending outward from the base portion adjacent the opposite end of the elongated member and perpendicular to the elongated member the reinforcement members affixed to the base portion and the upper housing surface.

20 Claims, 2 Drawing Sheets

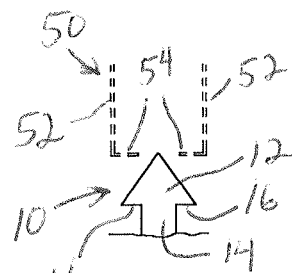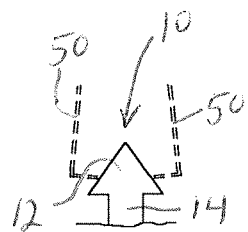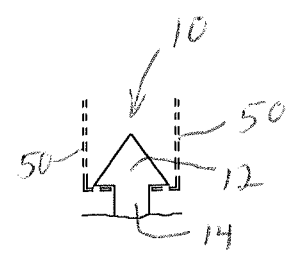
FIG. 3A  FIG. 3B  FIG. 3C
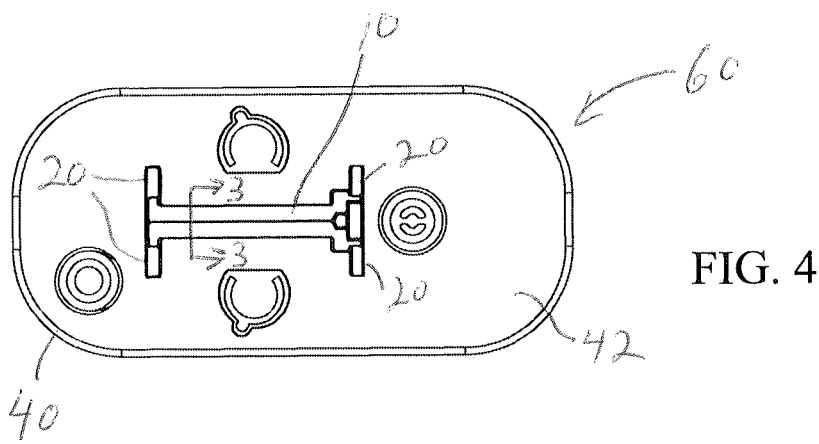
FIG. 4
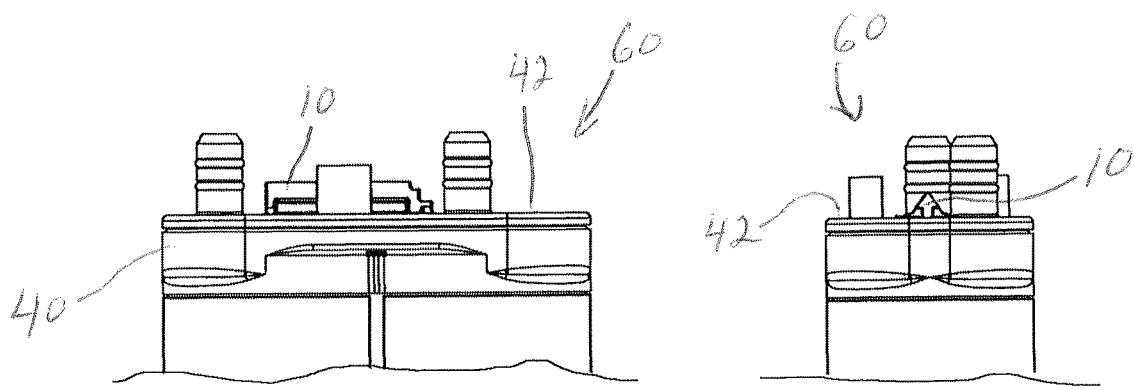
FIG. 5  FIG. 6

REINFORCED RECEIVER FOR CASSETTE FILTER LOCKING CLIP

BACKGROUND OF THE INVENTION

1. Field of the Invention

The present invention relates to a receiver for securing a cassette filter having a locking clip disposed on the cassette filter housing and in particular, a receiver which allows for a greater degree of structural integrity, including a variety of material to be used in construction thereof. The cassette filters are generally of the type used in water purification systems.

2. Description of Related Art

Environmental considerations have found their way into the manufacture of diverse products, including novel water filter designs. The push for eco-friendly alternatives have forced designs to consider lighter, more pliable material whose manufacture produces a smaller carbon footprint. Unfortunately, the introduction of such material makes for a weaker structure, which may cause integrity problems in areas where load-bearing strength is necessary and required.

In order to counter the inevitable degradation at known stress points, it is desirable to develop reinforced structural features that allow for the use of softer, more pliable material on a majority of the product, while the stress points, although of the same material, are made more robust through selected geometrical design modifications.

Structural integrity is particularly important when attempting to construct the cassettes filter parts which are in contact with the water being purified. Materials used in construction of water purification equipment may be polymers such as polypropylene or polyethylene, and although the polymers are ideal for water purification applications, polymers are relatively flexible, pliable, and soft. This makes the material a poor choice when it comes to structural integrity of the receiver. Polycarbonate is generally used in the manufacture of water purification equipment where greater integrity is necessary, and although stronger than polypropylene or polyethylene, contains material which may be leached into purified water.

The present invention is particularly useful in securing a cassette cartridge to the filter housing or filter manifold.

SUMMARY OF THE INVENTION

Bearing in mind the problems and deficiencies of the prior art, it is an object of the present invention to provide a receiver constructed of a variety of polymers, lighter and substantially more pliable than that of current filter cartridge designs, for securing a cassette filter which provides sufficient support for engaging a locking clip on the cassette filter housing to prevent unlatching of the filtration cassette from the cassette housing.

It is another object of the present invention to provide a receiver which includes sufficient geometry to ensure strength and reliability in attachment when incorporating poly materials in its manufacture.

A further object of the invention is to provide a receiver on a cassette filter which includes specific reinforcement members for preventing receiver breakage during use, and for enhancing the receiver reliability.

It is another object of the present invention to provide a reinforced polymer receiver for securing a filter cassette to a filter housing.

Still other objects and advantages of the invention will in part be obvious and will in part be apparent from the specification.

The above and other objects, which will be apparent to those skilled in the art, are achieved in the present invention which is directed to a receiver for a cassette filter housing having an upper housing surface. The receiver comprises an arrow shaped elongated member having ends. The elongated member may be parallel with an upper surface of the cassette and may include a base portion attached to the upper housing surface the cross-section of which is a substantially planer segment extending to the upper surface. The elongated member includes an upper receiver portion having at least one cavaliered retaining surface. The receiver includes a first reinforcement member extending outward from the base portion adjacent one of the ends of the elongated member and perpendicular to the elongated member, and a second reinforcement member extending outward from the base portion adjacent the opposite end of the elongated member and perpendicular to the elongated member the reinforcement members affixed to the base portion and the upper housing surface. The elongated member is engagable with a locking clip having at least one foot engagable with the at least one retaining surface when the receiver and locking clip are in the locked position. The reinforcement member provides support for the receiver.

The first and second reinforcement members may be affixed to the upper receiver portion. The elongated member may have a width and a length greater than the width wherein each end of the elongated member includes a pair of reinforcement members extending in opposing directions from each other and substantially perpendicular to elongated member length. The receiver may be polypropylene or polyethylene. The receiver may include fiberglass reinforcement. The receiver may be metallic or ceramic. The elongated member may be metallic or ceramic.

Another aspect of the invention is directed to a receiver for a cassette filter housing having an upper housing surface. The receiver comprises an elongated member parallel with an upper surface of the cassette, the elongated member including a base portion attached to the upper housing surface and an upper receiver portion having at least one retaining surface. The receiver may also include at least one triangular reinforced end member integrally formed with the elongated member and the upper housing surface. The elongated member may be engagable with a locking clip having at least one base foot engagable with the at least one retaining surface when the receiver and locking clip are in the locked position. The reinforcement member provides support for the receiver.

The elongated member may include opposing ends with the at least one triangular reinforced member disposed at one end of the elongated member and a second triangular reinforced member at the opposing end of the elongated member. The at least one triangular reinforced member may include stepped portions along a top portion thereof for allowing clearance of the cassette filter housing when the locking clip and receiver are in the engaged position. The at least one triangular reinforced member may be of a solid construction. The at least one triangular reinforced end member may be affixed to the upper receiver portion. The elongated member may have a width and a length greater than the width wherein each end of the elongated member includes a pair of reinforcement members extending in opposing directions from each other and substantially perpendicular to elongated member length. The receiver may be polypropylene or polyethylene. The receiver may include fiberglass reinforcement. The receiver may be metallic or ceramic. The elongated member may be metallic or ceramic.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

FIG. 3A is a cross-sectional view of the receiver shown in FIG. 2 across lines 3-3 before engaging with a cassette manifold locking clip.

FIG. 3B is a cross-sectional view of the receiver shown in FIG. 4 across lines 3-3 in the process of engaging with a cassette manifold locking clip.

FIG. 3C is a cross-sectional view of the receiver shown in FIG. 4 across lines 3-3 fully engaged with a cassette manifold locking clip.

FIG. 4 is a top plan view of the receiver mounted on a cassette filter cap according to the present invention.

FIG. 5 is a front elevational view of the receiver mounted on a cassette filter cap according to the present invention.

FIG. 6 is a side elevational view of the receiver mounted on a cassette filter cap according to the present invention.

DESCRIPTION OF THE PREFERRED EMBODIMENT(S)

Figure 1:
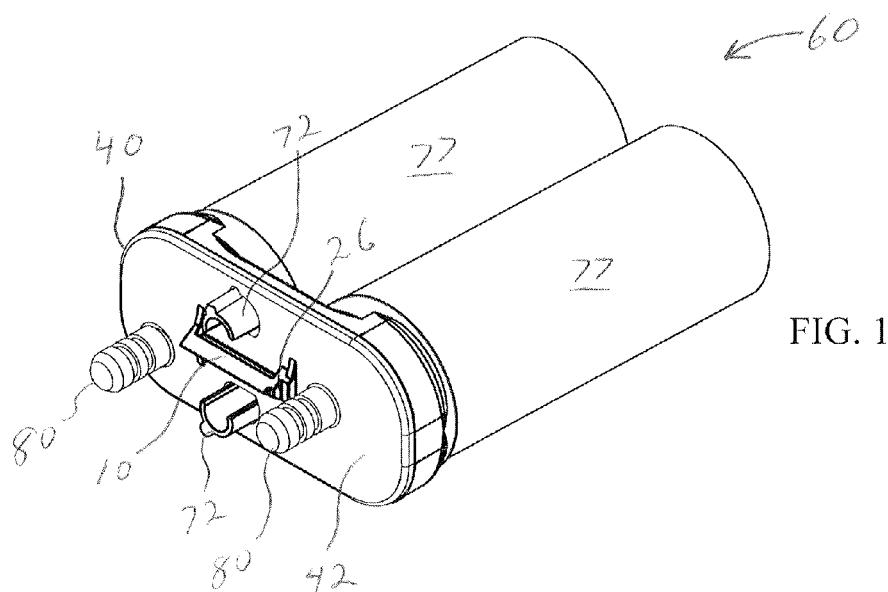
FIG. 1 is a perspective view of the receiver mounted on a cassette filter cap according to the present invention.
Figure 2:
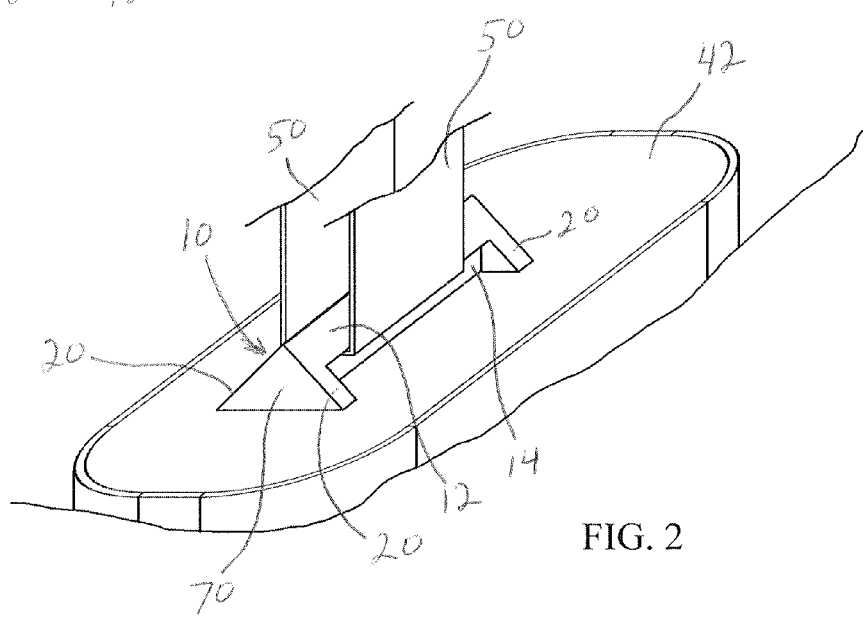
FIG. 2 is a perspective view of the receiver fully engaged with a cassette manifold locking clip according to the present invention.

The preferred embodiment of the present invention is a reinforced receiver for a locking clip on a cassette filter as shown in FIGS. 1-6. In FIG. 1, a cassette filter 60 includes a cassette filter cap 40. The reinforced receiver 10 is mounted on the base surface 42 of a cassette filter cap 40. The cassette filter includes inlet/outlet ports 80, filter cartridges 77, and may include alignment guides 72 for lining up the cassette filter with a cassette filter housing. The receiver 10 includes an elongated top member 12 and base portion 14, attached to, and parallel with, an upper surface of the cassette. The receiver 10 is engagable with a locking clip 50 as shown in FIG. 2, the locking clip being disposed on a cassette filter manifold (not shown). Receiver end portions 70 are solid and integral with the upper housing surface 42, the elongated top portion 12, and the base portion 14. The end portions 70 may be triangular in shape as shown in FIG. 2 or may include steps 26 of decreasing width as a function of height as shown in FIG. 1 to allow for clearance of a cassette filter housing to which the cassette filter is attachable. FIGS. 3A-3C show a cross-section of the progression in which the locking clip 50 engages with the receiver 10. The receiver 10 includes a triangular elongated top portion 12, a cavaliered portion 16 and a receiver support portion 14 which connects the receiver top portion 12 to the base surface 42 of the cassette filter cap 40. Reinforcement members 20 are attached to the upper portion 12, cavaliered portion 16, and the support portion 14, and provide structural reinforcement of the receiver to the base surface 42 of the cassette filter cap 40. The locking clip includes a pair of opposing legs 52 and a foot 54 on each leg 52 extending inward from the leg. The legs 52 of the locking clip 50 are biased such that the legs 52 are substantially parallel in a normal position and are flexible in an outward direction so the locking clip may slide along the elongated top member 12 of the receiver, urging the legs 52 outward as the clip moves toward the wide portion of the triangle. The locking clip is fully engaged with the receiver when the feet of the locking clip 10 are positioned under the cavaliered portion 16 of the receiver. FIGS. 4-6 show top, front, and side views of the receiver 10 attached to the surface 42 of the cassette filter cap 40.

The objective of providing a receiver for securing a cassette filter which provides sufficient support for engaging a locking clip on the cassette filter housing to prevent unlatching of the filtration cassette from the cassette housing has been met. Additionally, the receiver includes sufficient geometry to incorporate poly materials for use in its manufacture. The present invention includes reinforcement members for preventing receiver breakage during use and provides a reinforced polymer receiver for securing filter cassette to a filter housing.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention, what is claimed is:

1. A receiver for a cassette filter housing having an upper housing surface the receiver comprising:
   an arrow shaped elongated member parallel with an upper surface of the cassette, the elongated member having ends and including a base portion attached to the upper housing surface the cross-section of which is a substantially planer segment extending to the upper surface, and an upper receiver portion having at least one cavaliered retaining surface; and
   a first reinforcement member extending outward from the base portion adjacent one of the ends of the elongated member and perpendicular to the elongated member, and a second reinforcement member extending outward from the base portion adjacent the opposite end of the elongated member and perpendicular to the elongated member the reinforcement members affixed to the base portion and the upper housing surface;
   whereby the elongated member is engagable with a locking clip having at least one foot engagable with the at least one retaining surface when the receiver and locking clip are in the locked position and the reinforcement member provides support for the receiver.

2. The apparatus of claim 1 wherein the first and second reinforcement members are affixed to the upper receiver portion.

3. The apparatus of claim 1 wherein the elongated member has a width and a length greater than the width, and wherein each end of the elongated member includes a pair of reinforcement members extending in opposing directions from each other and substantially perpendicular to elongated member length.

4. The apparatus of claim 1 wherein the receiver is polypropylene.

5. The apparatus of claim 1 wherein the receiver is polyethylene.

6. The apparatus of claim 4 wherein the receiver includes fiberglass reinforcement.

7. The apparatus of claim 1 wherein the receiver is metallic.

8. The apparatus of claim 1 wherein the receiver is ceramic.

9. The apparatus of claim 1 wherein the elongated member is metallic.

10. The apparatus of claim 1 wherein the elongated member is ceramic.

11. A receiver for a cassette filter housing having an upper housing surface the receiver comprising:

a fixed, immobile elongated member parallel with an upper surface of the cassette, the elongated member including a base portion attached to the upper housing surface and an upper receiver portion having at least one retaining surface, said base portion being substantially centered on the elongated member and retains the elongated member in a fixed position; and at least one triangular reinforced end member integrally formed with the elongated member and the upper housing surface;

whereby the elongated member is engagable with a slidably engaging manifold locking clip having at least one foot engagable with the at least one retaining surface when the receiver and locking clip are in the locked position and the at least one triangular reinforced end member provides support for the receiver.

12. The apparatus of claim 11 wherein the elongated member includes opposing ends with the at least one triangular reinforced member disposed at one end of the elongated member and a second triangular reinforced member at the opposing end of the elongated member.

13. The apparatus of claim 11 wherein the at least one triangular reinforced member includes stepped portions along a top portion thereof for allowing clearance of the cassette filter housing when the locking clip and receiver are in the engaged position.

14. The apparatus of claim 11 wherein the at least one triangular reinforced member is solid.

15. The apparatus of claim 11 wherein the at least one reinforcement member is affixed to the upper receiver portion.

16. The apparatus of claim 11 wherein the receiver is polypropylene.

17. The apparatus of claim 11 wherein the receiver is polyethylene.

18. The apparatus of claim 16 wherein the receiver includes fiberglass reinforcement.

19. The apparatus of claim 11 wherein the elongated member is metallic.

20. The apparatus of claim 11 wherein the elongated member is ceramic.

* * * * *